Jan. 25, 1927.
W. M. BRADSHAW
1,615,678
REGULATOR SYSTEM
Filed July 13, 1922
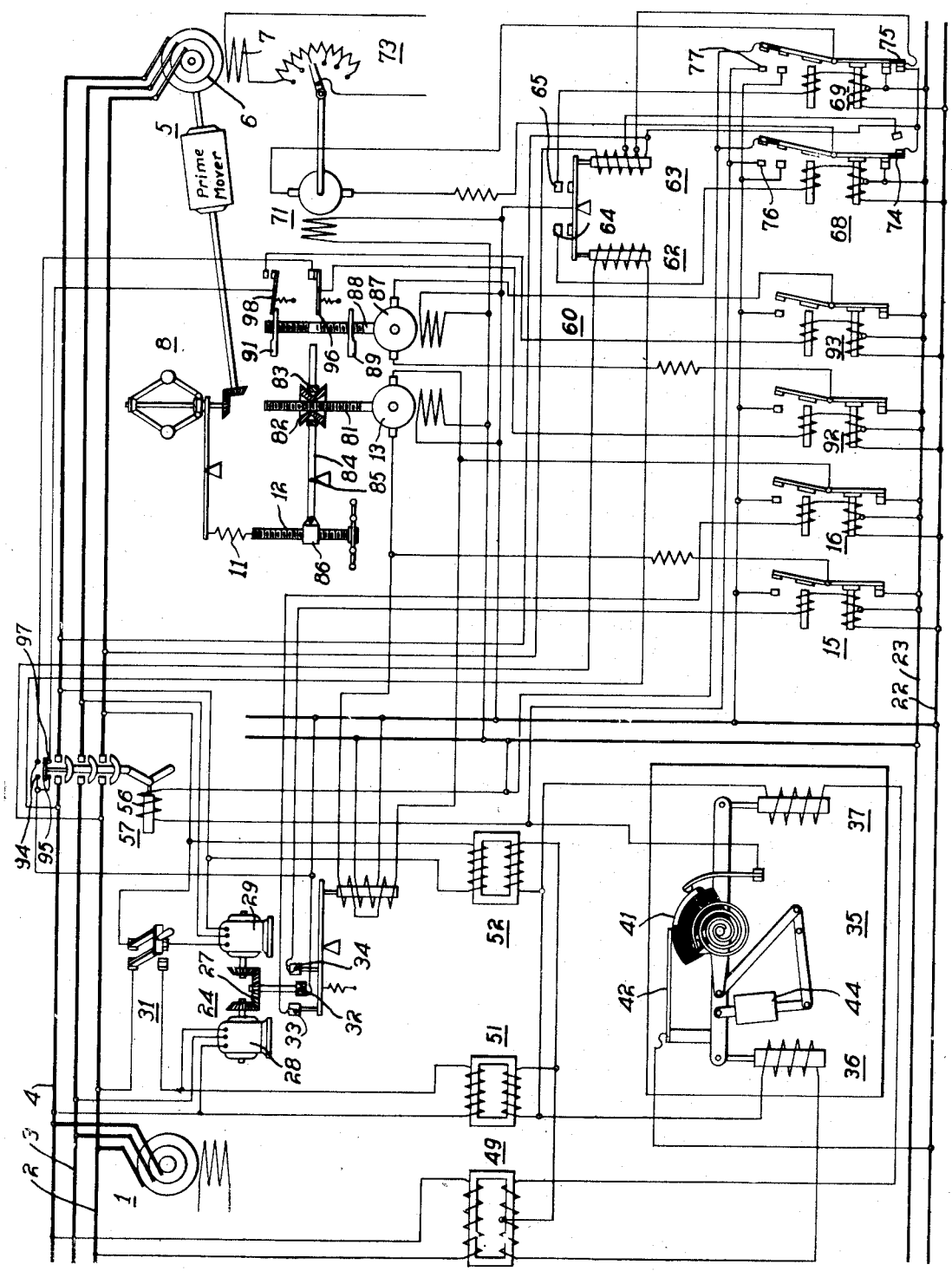
WITNESSES:
INVENTOR
William M. Bradshaw
BY
ATTORNEY Patented Jan. 25, 1927.

1,615,678

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed July 13, 1922. Serial No. 574,720.

My invention relates to systems of control for a plurality of dynamo-electric machines and it has special relation to combined governing and regulating means therefor.

One object of my invention is to provide a system of the above-indicated character that shall be responsive to certain electrical characteristics of each of the machines to govern the parallel operation of said machines.

Another object of my invention is to provide a system of the above-indicated character that shall be responsive to certain electrical characteristics of said machines to connect said machines together when such characteristics thereof coincide and thereafter cause the above-mentioned governing means to operate at a predetermined setting.

A still further object of my invention is to provide a system of the above-indicated character that shall set the governor mechanism for one of the prime movers in accordance with certain operating characteristics of another of the prime movers and that shall subsequently reset said governor mechanism to coincide with the normal operating characteristics of the prime mover second-mentioned.

In a system wherein there are one or more dynamo-electric machines connected to a power circuit and it is desired to couple an additional machine to said circuit, governing means have been proposed to withhold the actual connection of the additional machine to the power circuit until certain electrical conditions thereof correspond to the electrical conditions of the power circuit. Such means are shown, for example, in the application of Wm. Bradshaw and J. H. Ashbaugh, Serial No. 576,241, filed July 20, 1922, and assigned to the Westinghouse Electric & Manufacturing Company.

However, with such a system, when the additional machine is connected to the line, its governor mechanism is at that time set to maintain the conditions of the power circuit that existed at the time the machines were coupled together. When the auxiliary machine is connected to the line, the frequency of its currents is low with respect to the normal frequency of the currents of the power circuit. The governor mechanism of the main machine is striving to maintain that normal frequency while the governor mechanism of the auxiliary machine is tending to maintain the frequency existing when the machines were paralleled. It, therefore, becomes desirable to reset the governor mechanism of the auxiliary machine so that its setting will correspond to that of the primary machine, and to accomplish this operation automatically and in its proper sequence.

My invention will be best understood from the accompanying drawing, wherein the single figure is a diagrammatic illustration of the circuits and apparatus embodying my invention.

Since the governing mechanisms that are responsive to the phase coincidence of the currents of the respective machines, to the balancing of the voltages of the respective machines, and to the balancing of the speeds of said machines to control the paralleling of said machines and the setting of the governor mechanism so that the auxiliary machine is operating at the proper speed when the machines are paralleled, are described in detail in the above-entitled application, only a brief résumé thereof will be given in the present application, reference being made to the above-entitled application for the full and complete disclosure thereof.

In so far as practicable, the same reference numerals will be used herein to indicate corresponding parts in the inventions of the two applications. As set forth in the above-entitled application, a main generator 1 is connected to a power circuit comprising conductors 2, 3 and 4. An auxiliary generator 5, having an armature 6 and a field winding 7, is adapted to be operated by a prime mover, such as a water wheel. The prime mover is adapted to be controlled by any standard governor mechanism, such as the illustrated flyball governor 8, which works against the tension of a spring 11. The tension of the spring 11 is adjustable by means of a screw mechanism 12, through the operation of a motor 13 and the intermediate mechanism to be hereinafter described. The direction of rotation of the motor 13 is governed by reversing switches 15 and 16, which are energized from control bus bars 22 and 23.

The reversing switches are selectively controlled in accordance with the operation of a differential mechanism 24, the opposite portions of which are controlled by synchronous motors 28 and 29, which are respectively connected to the power circuit 2, 3, 4, and the circuit of the auxiliary generator 5. The intermediate gear 27 of the differential mechanism controls a contact member 32 that is adapted to engage either of contact members 33 and 34, which are respectively in circuit with the operating coils of switches 15 and 16.

An automatic synchronizer 35, which may be of any well-known construction, such as that exemplified by the patent to J. H. Mc-Mahan, No. 819,787, issued May 8, 1906, and assigned to the Westinghouse Electric & Manufacturing Company, is adapted to directly control the operation of the circuit-breaker 57 in accordance with the relation of the frequencies of the respective circuits.

The operating coils 36 and 37 of the synchronizer 35 are connected to transformers 49, 51 and 52, so as to be controlled in accordance with the frequency of the main and of the auxiliary generators, respectively. While the periodicity of the current of the auxiliary generator is at variance with that of the current of the power circuit, the current from the transformers 51 and 52 will traverse the halves of the secondary winding of transformer 49 in opposite directions, and will also traverse each of the electromagnets 36 and 37. When the periodicities of the currents coincide, the electromagnet 37 will exert a pull in excess of that of the electromagnet 36, thereby moving the brush 42 into engagement with the contact strip 41 to complete the circuit therethrough. The circuit thus completed extends to the operating coil 56 of the circuit-breaker 57, which serves to couple the main and the auxiliary machines in parallel.

The synchronizer 35 has a dash-pot 44 co-operating therewith, whereby the operation of the synchronizer is rendered proportional to the rate at which the generators approach synchronism.

A voltage-balancing regulator 60 is also provided and comprises electromagnets 62 and 63 that are respectively energized from the power circuit and the circuit of the auxiliary generator. The balancer controls the contact members 64 and 65 to selectively close the circuit therethrough and thus control the operation of reversing switches 68 and 69, which are similar in construction to reversing switches 15 and 16, heretofore described. The reversing switches 68 and 69 control the direction of rotation of the motor 71 of a motor-operated rheostat 73 that is located in the circuit of the field-magnet winding 7 of the auxiliary generator. If the voltage of the auxiliary generator is lower than the voltage of the power circuit, the contact members 64 will be closed to operate reversing switch 68, thereby strengthening the field-magnet winding of the auxiliary generator. The reverse operation occurs if the voltage of the auxiliary generator is above that of the power circuit. The switches 68 and 69 control auxiliary contact members 76 and 77, which are connected in parallel relation across the circuit to the coil 56 of the circuit-breaker 57. Thus, when either of switches 68 and 69 is in operative position, the coil 56 will be short-circuited, so that even though the synchronizer 35 completes the circuit to the circuit-breaker 57, the latter will not be able to close until the voltages of the respective circuits balance.

The circuit from the differential contact members 32, 33 and 34 extends to the operating coils of the respective switches 15 and 16 to rotate the reversible motor 13 and its screw shaft 81. The shaft 81 carries a split washer 82 that is capable of opening in both directions under the action of a collar 83, which is mounted upon a lever arm 84. The lever arm is pivoted, as indicated at 85, and is connected to a nut 86 that co-operates with the adjusting screw 12 of the governor mechanism. The motor 13 will function to increase or decrease the tension of the spring 11, depending upon which of the switches 15 or 16 is energized, to correspondingly change the setting of the governor mechanism 8, so that it will have a setting corresponding to the speed at which the main generator is operating at the time the machines are paralleled. As explained above, this operating speed is dependent upon the load conditions of the generator 1.

If the setting of the governor mechanism 8 were left at this point, it would continue to function for the low setting that obtained when the generator 5 was connected to the line. This value is below its normal setting and also the setting of the governor mechanism of the main generator. If the auxiliary generator is to take any of the load of the power circuit, it becomes necessary to restore the setting of the governor mechanism 8 to its normal position, which corresponds to the normal position of the governor mechanism of the main generator, and this resetting should be done automatically. Therefore, there is provided a motor 87 that operates a screw shaft 88 having threads extending in opposite directions. Mounted upon one end of the shaft 88 is a lug 89 that is adjustable along the shaft and is adapted to engage the under side of the lever 84. Mounted upon the other end of the shaft 88 is a lug 91 that is also adjustable along the shaft and is adapted to descend into contact with the upper side of the lever 84. The intermediate region where the lugs 89 and 91 meet, is the normal central position of the lever 84, and the normal operating position for the governor mechanism 8.

The direction of rotation of the motor 87 is controlled by reversing switches 92 and 93, which are similar in construction to the reversing switches 15 and 16 heretofore described. The operation of the motor 87 is initiated by the bridging of contact members 94 by an auxiliary switch member 95 that is carried by the circuit-breaker 57, the bridging operation being simultaneous with the operation of the circuit-breaker. The circuit through the contact members 94 extends to the operating coil of the reversing switch 92 through limit switch 96. As the motor 87 operates, the lugs 89 and 91 are moved toward each other until lug 89 engages limit switch 96, whereupon the circuit to the operating coil of the reversing switch 92 is interrupted and, accordingly, the operation of the motor 87 is stopped. The motor will remain in this position until the circuit-breaker 57 is opened. Simultaneously with the opening of the circuit-breaker, the auxiliary bridging member 95 engages contact members 97 to complete the circuit to the operating coil of the reversing switch 93, which circuit extends through limit switch 98. The resultant operation of the motor 87 will separate the lugs 89 and 91 until lug 91 engages the limit switch 98, thereby interrupting the circuit to the operating coil of the reversing switch 93 and, accordingly, stopping the motor 87.

From this description, it will be apparent that over-running of the motor 87 is prevented, as is operation of the motor in the wrong direction.

Assuming that the load upon the generator 1 has caused the frequency of the current of the power circuit to be reduced from sixty cycles to fifty-five cycles, it becomes desirable to couple the auxiliary generator to the power circuit. It, therefore, becomes necessary to regulate the operation of the auxiliary generator to bring it into synchronism with the generator 1. The operation of the voltage balancer and of the synchronizer is initiated either manually or automatically and combined to regulate the auxiliary generator. When the generators are synchronized, the setting of the governor mechanism 8 is such that the auxiliary generator will deliver a current having a frequency of 55 cycles.

When the circuit-breaker 57 is closed, the auxiliary contact members 94 carried thereby are closed to complete the energizing circuit for the motor 87 to rotate the screw shaft 88, thereby bringing the lugs 89 and 91 together. The lugs 89 and 91 in coming together engage the end of the lever 84, and move it to a predetermined position, sliding the nut 82 along the shaft 81. They will continue to move until they meet at substantially the center of the shaft 88, at which position the tension upon the spring 11 will have been restored, and the setting of the governor mechanism 8 will likewise have been restored, to its normal position.

Modifications in the system and arrangement and location of parts may be made within the spirit and scope of my invention, and such modifications are intended to be covered by the appended claims.

I claim as my invention:—

1. The combination with a power circuit, a dynamo-electric machine, a prime mover therefor, means for governing the operation of said prime mover, switching means for connecting said machine to the power circuit, control means comprising a differential mechanism governed from said power circuit and said dynamo-electric machine, and synchronizing means adapted to control the energizing circuit for said switching means, of means for determining the setting of said governor after the operation of said switching means.

2. The combination with a power circuit, a dynamo-electric machine, a prime mover therefor, means for governing the operation of said prime mover, switching means for connecting said machine to the power circuit, control means comprising a differential mechanism governed from said power circuit and said dynamo-electric machine, and synchronizing means adapted to control the energizing circuit for said switching means, and apparatus governed in accordance with the voltages of the power circuit and of the dynamo-electric machine adapted to also control the energizing circuit for said switching means, of means for thereafter determining the operating characteristics of said governing means.

3. The combination with a power circuit, a dynamo-electric machine and a governor mechanism therefor, of means for connecting said machine to said circuit, control means therefor and for said governor and operated in accordance with the speed of said machine, the phase relationship of the respective currents and the voltages of the respective circuits, and means for insuring a final setting of said governor mechanism at a predetermined position after said machine is connected to said power circuit.

4. The combination with a power circuit, a dynamo-electric machine, and a governor mechanism therefor, of means for connecting said machine to said circuit and for controlling said governor mechanisms, said means being responsive to the speed of said machine, the frequency of the respective currents and the voltages of the respective circuits, and means for insuring predetermined operating characteristics for said governor mechanism after said machine is connected to said power circuit.

5. The combination with a power circuit, a dynamo-electric machine and governor mechanism therefor, of means for connecting said machine to said circuit, said means being responsive to the frequency of the respective currents and the voltages of the respective circuits, means adapted to concurrently control the speed of said machine through the control of said governor mechanism, and means adapted to further control the speed of said machine through the control of said governor mechanism, after said machine is connected to said power circuit.

6. The combination with two disconnected dynamo-electric machines, of means for connecting said machines together, control means therefor comprising contact mechanism governed in accordance with the balancing of the currents of the respective circuits of said machines, means for rendering the action of the contact mechanism proportional to the rate of balancing of said machines, means for balancing the speeds of said machines, including governing mechanism therefor, and means for adjusting the governing mechanism after the operation of said connecting means.

7. The combination with two disconnected dynamo-electric machines, of means for connecting said machines together upon the obtaining of predetermined operating characteristics for one of said machines, said means being adapted to control the operation of the other of said machines in accordance with the relative speeds of said machines and with certain relative electrical characteristics of the circuits of said machines, and additional means adapted to thereafter co-ordinate the speeds of said machines.

8. The combination with a dynamo-electric machine, a second dynamo-electric machine, speed-governing means co-operating therewith, means for connecting said second machine in circuit with said first-mentioned machine upon the obtaining of predetermined operation of the latter machine, and control means therefor, said means also controlling said speed-governing means whereby the setting of said speed-governing means is made to correspond with the first-mentioned machine when the two machines are connected together, of additional means for restoring the setting of said governing mechanism to a predetermined normal position after said machines are connected together.

9. The combination with two disconnected dynamo-electric machines, speed-governing means co-operating with one of said machines, and means adapted to co-ordinate the operations of said machines and acting partially by changing the setting of said speed-governing means, of means for returning the setting of said speed-governing means to a predetermined normal position.

10. The combination with two disconnected dynamo-electric machines and speed-governing means co-operating with one of said machines, of means for connecting said machines together upon the attainment of predetermined electrical conditions of one of said machines, means for controlling the operation of said speed-governing means to co-ordinate the speeds of said machines at the time said machines are connected, and additional means for restoring the governor means to a predetermined position, means for initiating the operation of said additional means when said machines are connected together.

11. The combination with a power circuit and a dynamo-electric machine, means for connecting said machine to said circuit, of means for controlling the speed of said machine in accordance with certain characteristics of said power circuit, said means comprising governor mechanism, motor-operated means for regulating the setting of said governor mechanism, and additional motor-operated means for returning the setting of the governor mechanism to a predetermined normal position whenever said machine is connected to said power circuit.

12. The combination with a power circuit and a dynamo-electric machine, means for connecting said machine to said circuit, of means for controlling the speed of said machine and comprising a governor mechanism, and motor-operated means dependent upon the connection of the machine to the power circuit for changing the setting of said governor mechanism and for restoring the setting to a predetermined normal position after said machine is connected to said power circuit.

13. The combination with a power circuit and a dynamo-electric machine to be connected thereto, of means for controlling the speed of said machine and comprising a governor mechanism having a spring and an adjustable screw for determining the setting of said governor, a pivoted lever connected to said screw, and a motor for moving said lever to adjust the setting of said governor, means for operating said motor in accordance with certain electrical characteristics of said power circuit, of additional means for restoring the setting of said governor to a predetermined normal position.

14. The combination with a power circuit, and a dynamo-electric machine to be connected thereto, of means for controlling the speed of said machine and comprising a governor mechanism having a spring and an adjustable screw for determining the setting of said governor, a pivoted lever connected to said screw, and a motor for moving said lever to adjust the setting of said governor, means for operating said motor in accordance with certain electrical characteristics of said power circuit, of additional means for restoring the setting of said governor to a predetermined normal position, said additional means comprising a motor, the operation of which is initiated at the time said machine is connected to said power circuit, and a pair of lugs adapted to be moved together by said motor whereby said lever is restored to a normal position, and means for interrupting the motor circuit when the desired position is reached.

15. The combination with two disconnected dynamo-electric machines, speed-governing means for one of said machines, means for connecting the machines together, control means therefor operating in accordance with the current and the voltage indications of the respective circuits of said machines, and differential mechanism adapted to be operated in accordance with the speeds of said machines and to control the setting of said governor mechanism, of motor-operated means adapted to restore the setting of the governor mechanism to a predetermined normal position, means for initiating the operation of the motor actuated by the closure of said connecting means, and a limit switch for interrupting the operation of said motor when the governor mechanism has acquired the predetermined normal position.

16. The combination with two disconnected dynamo-electric machines, speed-governing means for one of said machines, means for connecting the machines together, control means therefor operating in accordance with the current and the voltage indications of the respective circuits of said machines, and differential mechanism adapted to be operated in accordance with the speeds of said machines and to control the setting of said governor mechanism, of motor-operated means adapted to restore the setting of the governor mechanism to a predetermined normal position, means for initiating the operation of the motor actuated by the closure of said connecting means, a limit switch for interrupting the operation of said motor when the governor mechanism has acquired a predetermined normal position, and additional means for returning the motor mechanism to its operative position whenever the machines are disconnected.

17. The combination with a dynamo-electric machine, governing means therefor, and motor means for adjusting the setting of said governing means, of control mechanism therefor comprising contact members operated by said machine, and reversing switches for controlling the direction of rotation of said motor, of additional means for restoring the setting of the governor mechanism to a predetermined normal position.

18. The combination with a dynamo-electric machine, governing means therefor, motor means for adjusting the setting of said governing means, control mechanism therefor comprising contact members operated by said machine, and reversing switches for controlling the direction of rotation of said motor, of additional means for restoring the setting of the governor mechanism to a predetermined normal position, and means for governing the operation of said restoring mechanism in both directions to prevent overrunning thereof.

19. The combination with a power circuit, a dynamo-electric machine, switching means for connecting said machine to said circuit and control means therefor adapted to be operated in accordance with the phase and voltage indications of said circuit and the circuit of said machine, of control means adapted to render the speed of said machine commensurate with said voltage and phase indications, and additional means adapted to cause said control means to operate said machine at a predetermined normal speed.

20. The combination with two disconnected dynamo-electric machines, means for connecting said machines together, and control means therefor adapted to synchronize the speeds and certain electrical characteristics of said machines, of additional means controlled in accordance with the synchronization of said machines for controlling the operation of one of said machines after said machines are synchronized to permit the same to thereafter function to a predetermined capacity.

In testimony whereof, I have hereunto subscribed my name this 10th day of July, 1922.

WILLIAM M. BRADSHAW.